June 4, 1968 B. H. DANN 3,387,219

DEMODULATOR CIRCUIT FOR ANGLE-MODULATION SYSTEMS

Filed Sept. 2, 1965 2 Sheets-Sheet 1

INVENTOR.
BERT H. DANN
BY Christie, Parker & Hale
ATTORNEYS.

June 4, 1968 B. H. DANN 3,387,219

DEMODULATOR CIRCUIT FOR ANGLE-MODULATION SYSTEMS

Filed Sept. 2, 1965 2 Sheets-Sheet 2

INVENTOR.
BERT H. DANN
BY
Christie, Parker & Hale
ATTORNEYS.

3,387,219
DEMODULATOR CIRCUIT FOR ANGLE-MODULATION SYSTEMS

Bert H. Dann, Altadena, Calif., assignor, by mesne assignments, to Bell & Howell Company, Chicago, Ill., a corporation of Illinois Filed Sept. 2, 1965, Ser. No. 484,705
8 Claims. (Cl. 329—50)

This inventioin relates to demodulator circuits and, more particularly, is concerned with an improved circuit for demodulating time modulated signals.

It is common practice in magnetic recording of wide band signals, such as video signals, to use time modulation of the carrier, such as frequency modulation. Because magnetic recording techniques introduce band width limitations, the frequency deviation produced by the modulation may be large in relation to the carrier frequency. For example, frequency deviations of the order of $\pm 50\%$ of the carrier frequency are commonly encountered. Since discriminator circuits do not provide sufficient linearity over such a wide frequency deviation, demodulators using pulse averaging techniques are used. Such pulse averaging demodulators are arranged to generate pulses at the zero crossover points of the frequency-modulated signal. These pulses are then passed through a low-pass filter. As the frequency varies due to the modulation, the duty cycle of the pulse signal varies, changing the DC component of the pulse signal. The DC component is derived at the output of the low-pass filter and varies in amplitude according to the time modulation of the input to the demodulator.

Because the pulses in a pulse averaging demodulator are generated coincident with both the positive-going and negative-going zero crossover points of the modulated carrier, generally two non-linear devices, such as diodes or transistors, are required to produce pulses of only one polarity. These non-linear devices have in the past been operated as on-off switches. However, saturation in transistors and diodes affects the storage time and therefore affects the on-off time which controls the output pulse duration. Because the storage time varies from transistor to transistor, it is difficult to build a switching circuit using two transistors having the required symmetry over the full range of frequencies encountered. While balancing techniques have been incorporated in these circuits, the adjustments are time consuming and the balance achieved is only effective at one carrier frequency.

In a properly operating modulator, zero-crossings are equally spaced when there is no modulation. For the demodulator to produce zero output under these conditions, the pulses generated by the pulse averaging type demodulator must be equal in area and equally spaced. If the pulses are not of equal area, there will be a ripple factor in the output of the demodulator circuit at the carrier frequency. Because the modulating frequency may be as high as 90% of the carrier frequency, it is impractical to design a filter which will reject the carrier frequency and pass the highest modulating frequency. Filters with such a sharp cut-off produce time delays in the higher frequencies which result in phase distortion between the higher and lower frequency components of the information signal. This has serious effects where the information signal is a video signal for generating a television picture.

The present invention provides a demodulator of the pulse averaging type for time modulated signals which is capable of generating clean rectangular current pulses of fixed duration and amplitude at every zero-crossing of the input wave. The pulses are of identical length on alternate positive and negative zero-crossings, and ringing, overshoot and noise effects are substantially attenuated.

The circuit exhibits excellent carrier-suppression characteristics. It requires no adjustable elements to achieve symmetry. As a result, the demodulator circuit of the present invention is less expensive to build, more foolproof in its operation and at the same time provides improved demodulating performance.

In brief, the demodulator of the present invention employs a pulse forming circuit utilizing a pair of transistors which are arranged to conduct alternately for a pretermined time with each zero-crossing of the input modulated carrier signal. The transistors are operated in a current mode in which the transistors when conducting are limited to an operating point within the linear operating range of the transistor. The transistors never operate in the collector saturation region as in conventional switching circuits. Therefore symmetry problems encountered in the usual transistor switching circuits are avoided.

For a more complete understanding of the invention, reference should be made to the accompanying drawings wherein.

Figures 1, 2:
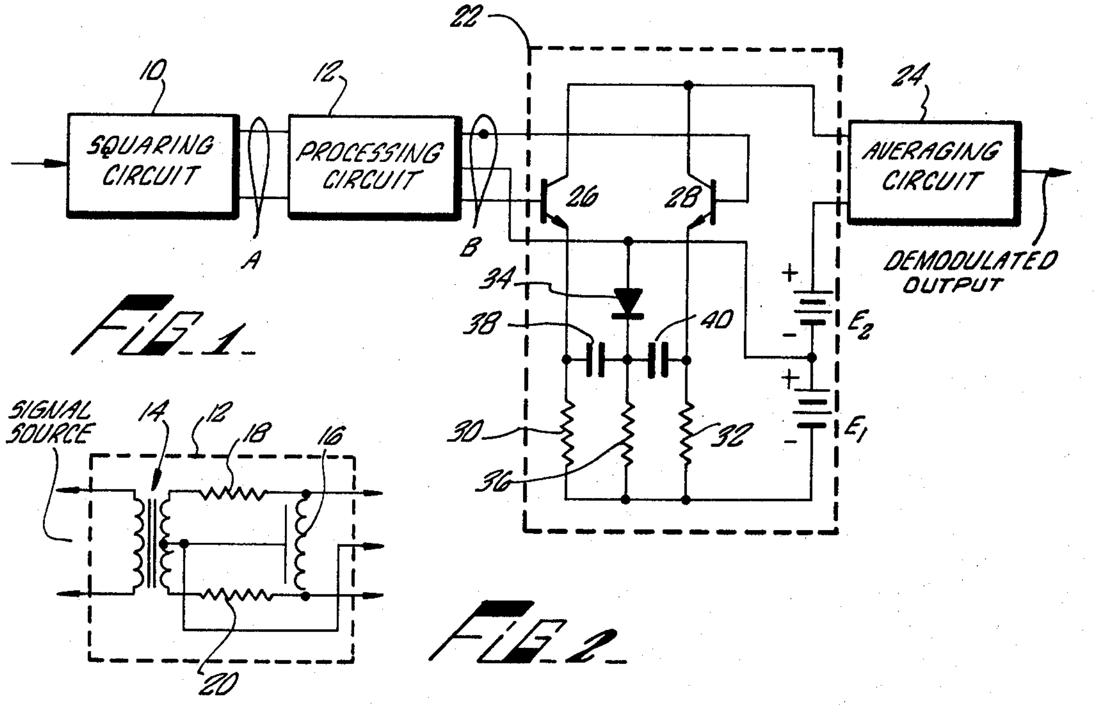
FIGURE 1 is a schematic diagram of one embodiment of the present invention.
FIGURE 2 is a schematic diagram of one type of processing circuit which can be used with the demodulator of FIGURE 1.
Figure 3A:
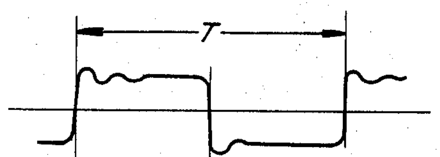
Figure 3B:
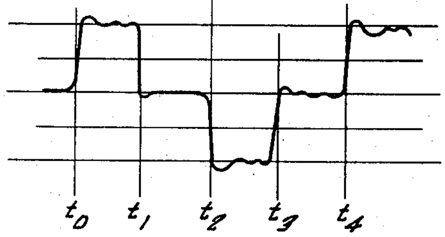
Figure 3C:
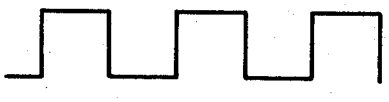
Figure 4:
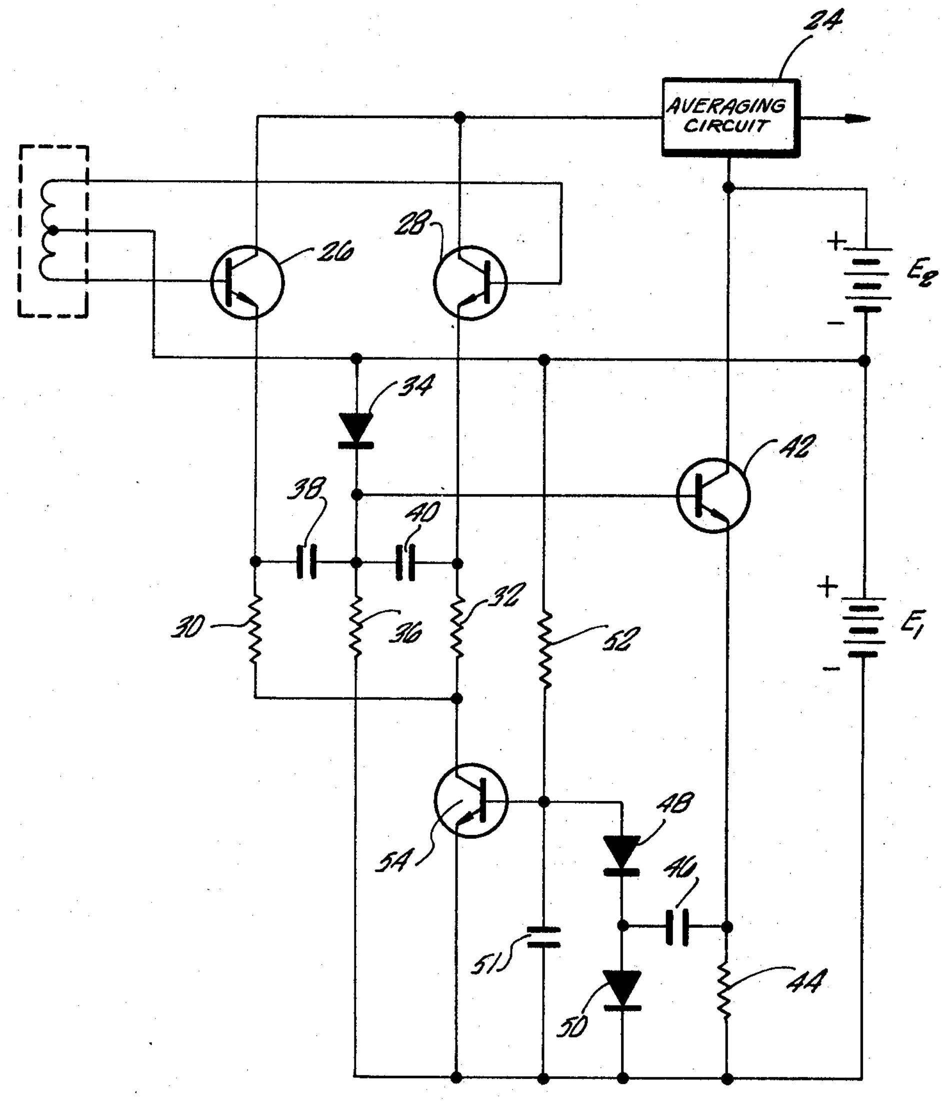

FIGURES 3A–C are a series of waveforms used in explaining the operation of FIGURE 1; and FIGURE 4 is a schematic diagram of a modified version of the demodulator circuit of the present invention.

Referring to FIGURE 1 in detail, the demodulating system includes means for first squaring the modulated circuit, as indicated by the squaring circuit 10. This may be a conventional amplifier and limiter type of squaring circuit. The waveform of the output of the squaring circuit is shown in FIGURE 3A.

The squared version of the modulated carrier is applied to a processing circuit indicated generally at 12. The function of the processing circuit 12 is to modify the square wave signal so as to provide pulses of constant time duration D coincident with the start of each half cycle of the square wave. There are a number of circuits which perform the function of the processing circuit 12. An example of one such circuit is shown in FIGURE 2 in which the square wave from the squaring circuit 10 is applied across the primary of a transformer 14 having a center-tapped secondary winding. The processor includes a symmetrical delay line 16 and a pair of resistors 18 and 20 connected in series across the ends of the secondary winding of the transformer 14. A voltage is retained between the center tap of the transformer at either end of the delay line 16 only for the delay time D of the delay line. Then the voltage across the delay line 16 goes to zero and the output voltage between the center tap and either end of the delay line goes to zero. The waveform of the output of the processing circuit is shown in FIGURE 3B. It will be noted that the processing circuit 12 provides a double-ended output in which the time duration D of both the alternate positive and negative-going pulses is fixed by the delay line 16. Thus the length of the pulses on alternate positive and negative zero-crossings is identical because they are derived from the same element, namely, the delay line in a symmetrical circuit.

The circuit for producing constant area pulses of the same polarity at both the positive and negative-going zero crossover points is indicated generally at 22. The output waveform of the demodulator pulse forming circuit 22 is shown in FIGURE 3C. These output pulses which are of equal time duration and amplitude, are applied to an averaging circuit 24 in the form of a low-pass filter which passes all frequencies up to the carrier frequency, but is designed to reject frequency components at twice the carrier frequency. The output of the averaging circuit 24 is the desired information signal.

The unique portion of the demodulator circuit is the demodulator pulse forming circuit 22. This circuit includes a pair of transistors 26 and 28 whose base electrodes are respectively connected to opposite ends of the delay line 16 of the processing circuit 12. The collector electrodes of the transistors 26 and 28 are connected through the averaging circuit 24 to the positive terminal of a potential source $E_2$. The negative terminal of the potential source $E_2$ in turn is connected to the center tap of the secondary winding of the transformer 14 in the processing circuit.

The emitter electrodes of the resistors 26 are respectively connected through relatively large resistors 30 and 32 to the negative terminal of another potential source $E_1$ in series with the potential source $E_2$. The resistors 30 and 32 are large enough to limit the emitter current to the linear operating range of the transistors, typically of the order of 2000 ohms.

A diode 34 and series resistor 36 are also connected across the potential source $E_1$, with capacitors 38 and 40 being connected between the series junction point between the diode 34 and the resistor 36, and to the respective emitters of the transistors 26 and 28 as shown.

In considering the operation of the demodulator circuit 22, it should be noted that the capacitors 38 and 40 together with the associated resistors 30, 32, and 36 form time constants which are long compared to the period of the lowest useful modulation frequency and therefore are extremely long compared to the period T of the modulated input signal. The circuit is designed so that at a particular center frequency of the modulated carrier, the pulses applied to the transistor bases by the processing circuit turn the transistors on and off alternately. The diode 34 and resistor 36 provide a bias level by means of the large capacitors 38 and 40 to insure that the transistors are turned off with the termination of the pulses from the processing circuit. The large resistors connecting the emitters to the negative supply voltage provide large degenerative feedback so that changes in the operating characteristics of the transistors with temperature or differences between the transistors do not affect the peak emitter current when the transistors are conducting.

The circuit of FIGURE 1 provides output current pulses of time duration D. The duration of the pulses is not changed by storage charge effects normally encountered in typical transistor circuits in which collector saturation occurs when the transistor is turned on. The present circuit limits the collector current to the linear operating range so that the transistor turns off and on more rapidly.

At the same time, the current level during successive output pulses is constant. Because of the large degenerative effect of the emitter resistor, the collector current does not vary with small changes in base-to-emitter voltage. Therefore slight differences between base-emitter voltage drops of the two transistors do not cause an appreciable difference in the magnitudes of successive output current pulses. The matching of collector current levels in the two transistors is simply achieved by carefully matching the values of the emitter resistors 30 and 32. Assuming the transistors 26 and 28 have reasonably high alpha values, any difference in the value of alpha for the two transistors will not have any significant effect on the magnitude of successive current pulses.

It should be noted that the bias level developed across the resistor 36 and capacitors 38 and 40 is a function of the period T. If the average period T does not change, the circuit of FIGURE 1 can be used. Short term change in T due to modulation does not change the collector current level of the conducting transistor because the voltage across the capacitors does not change materially on a short term basis but is determined by the average period over a large number of cycles.

However, where the center frequency of the carrier may vary, the circuit of FIGURE 4 is preferred. In this arrangement, instead of connecting the bias resistor 36 and emitter resistors 30 and 32 together to the negative terminal of the potential source $E_1$, the emitter resistors 30 and 32 are connected to a feedback circuit arrangement which maintains the peak to peak voltage swing in the emitter voltage constant over a substantial change in the average carrier period T. The feedback circuit senses the peak to peak voltage swing of the emitters at the anode of the diode 34 by means of an emitter follower circuit including a transistor 42 and an emitter load resistor 44. The signal developed across the resistor 44 is coupled through a large capacitor 46 to the series junction point of a voltage doubler including a pair of diodes 48 and 50 and shunt capacitor 51 connected in series with a resistor 52 across the voltage supply $E_1$. A transistor 54 has its collector-emitter terminals connected between the negative terminal of the potential source $E_1$ and the common junction between the emitter resistors 30 and 32. The base of the transistor 54 is connected to one end of the resistor 52 so that normally the transistor 54 is at collector saturation with minimum voltage drop between the collector and the emitter.

The effect of the feedback circuit is to maintain the peak voltage at the cathode of the diode 34 at a constant level which in turn keeps the switching level of the transistors 26 and 28 at a constant level. The reference which establishes this level is the forward voltage drop across the diodes 48 and 50 which is of the order of 0.5 volt. If the peak voltage at the cathode increases, the conduction of transistor 54 is reduced thereby reducing slightly the emitter current in the transistors 26 and 28 and causing the peak voltage at the cathode of the diode to be substantially constant.

What is claimed is:

1. In a demodulator for time modulated signals, the circuit comprising first and second transistors each having emitter, collector, and base electrodes, means connecting the collector electrodes through a common load impedance to one end of a potential source, first and second resistors connected respectively to the emitter electrodes of the two transistors, means connecting the resistors through a common current path to the other end of said potential source, impedance means connecting each of the base electrodes to an intermediate potential point of said potential source, means for alternately pulsing the base electrodes with pulses of the same polarity, a third resistor connected at one end to said other end of the potential source, a diode connecting the other end of the third resistor to said intermediate potential point, and a pair of large capacitors connected respectively between the junction point of the diode and the third resistor and the emitters of the two transistors.

2. In a demodulator for time modulated signals, the circuit comprising first and second transistors each having emitter, collector, and base electrodes, means connecting the collector electrodes through a common load impedance to one end of a potential source, first and second resistors connected respectively to the emitter electrodes of the two transistors, means connecting the resistors through a common current path to the other end of said potential source, means for alternately pulsing the base electrodes with pulses of the same polarity to alternately turn on the transistors, a third resistor connected at one end to said other end of the potential source, a diode connecting the other end of the third resistor to an intermediate potential point of said potential source, and a pair of large capacitors connected respectively between the junction point of the diode and the third resistor and the emitters of the two transistors.

3. In a demodulator for time modulated signals, the circuit comprising first and second transistors each having emitter, collector, and base electrodes, means connecting the collector electrodes to one end of a potential source, first and second resistors connected respectively to the emitter electrodes of the two transistors, means connecting the resistors through a common current path to the other end of said potential source, impedance means connecting each of the base electrodes to an intermediate potential point of said potential source, means for alternately pulsing the base electrodes with constant duration pulses of the same polarity, means including a third resistor connected at one end to said other end of the potential source, a diode connecting the other end of the third resistor to said intermediate potential point, and a pair of large capacitors connected respectively between the junction point of the diode and the third resistor and the emitters of the two transistors.

4. Apparatus as defined in claim 3 wherein the first and second resistors are equal and larger than the third resistor.

5. In a demodulator for time modulated signals, the circuit comprising first and second transistors each having emitter, collector, and base electrodes, impedance means connecting the collector electrodes to one end of a potential source, first and second resistors connected respectively to the emitter electrodes of the two transistors, means connecting the resistors through a common current path to the other end of said potential source, impedance means connecting each of the base electrodes to an intermediate potential point of said potential source, means responsive to the time modulated signals for alternately pulsing the base electrodes with pulses of the same polarity to turn on the transistors alternately, said means including a unidirectional conductive device and a third resistor connected between said intermediate point and said other end of the potential source, said device being biased by the potential source to normally conduct current through the resistor, and a pair of large capacitors connected respectively between the junction point of the diode and the third resistor and the emitters of the two transistors.

6. Apparatus as defined in claim 5 wherein the means connecting the first and second resistors to said other end of the potential source includes a variable impedance device forming said common current path, and feedback means responsive to variations in the average peak potential at the junction between the unidirectional conductive device and third resistor for controlling the variable impedance means.

7. Apparatus as defined in claim 5 wherein the means connecting the first and second resistors to said other end of the potential source includes a third transistor having the emitter-collector circuit forming said common current path, and feedback means responsive to variations in the average peak potential at the junction between the unidirectional conductive device and third resistor for controlling the base current.

8. In a demodulator for a time modulated signal, the circuit comprising first and second transistors each having emitter, collector, and base electrodes, impedance means connecting the collector electrodes through a common current path to one end of a first potential source, impedance means connecting the base electrodes to the other end of the first potential source, means for alternately pulsing the base electrodes with pulses of the same polarity and constant time duration in synchronism with the zero crossover points of the modulated signal, first and second resistors connected in series respectively with the emitter electrodes of the first and second transistors, means including a second potential source connecting the first and second resistors through a common current path to said other end of the first potential source, a unidirectional conductive device and third resistor connected across a potential source, and first and second capacitors connected respectively between the emitters and the series junction point of the third resistor and said device.

No references cited.

ALFRED L. BRODY, *Primary Examiner.*